United States Patent
Frait et al.

(10) Patent No.: US 8,960,393 B2
(45) Date of Patent: *Feb. 24, 2015

(54) MODULAR POWERTRAIN COMPONENT FOR HYBRID ELECTRIC VEHICLES

(75) Inventors: Steven A. Frait, Milan, MI (US); Keith A. Devereaux, Roseville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 221 days.

This patent is subject to a terminal disclaimer.

(21) Appl. No.: 13/362,037

(22) Filed: Jan. 31, 2012

(65) Prior Publication Data

US 2013/0192947 A1    Aug. 1, 2013

(51) Int. Cl.
    *B60K 6/387* (2007.10)
(52) U.S. Cl.
    USPC .............. 192/3.21; 192/85.25; 192/85.29
(58) Field of Classification Search
    USPC ............................ 192/85.25, 85.39
    See application file for complete search history.

(56) References Cited

U.S. PATENT DOCUMENTS

| | | | |
|---|---|---|---|
| 6,258,001 B1 * | 7/2001 | Wakuta et al. | 475/5 |
| 6,340,339 B1 * | 1/2002 | Tabata et al. | 475/5 |
| 7,679,238 B2 | 3/2010 | Nomura et al. | |
| 2006/0289209 A1 * | 12/2006 | Grosspietsch et al. | 180/65.2 |
| 2007/0007095 A1 | 1/2007 | Tsukamoto et al. | |
| 2008/0093135 A1 | 4/2008 | Nomura et al. | |
| 2008/0099258 A1 * | 5/2008 | Berhan | 180/65.2 |
| 2009/0100965 A1 * | 4/2009 | Sanji et al. | 74/606 R |
| 2010/0062899 A1 * | 3/2010 | Engelmann et al. | 477/86 |
| 2010/0105518 A1 | 4/2010 | Kasuya et al. | |
| 2010/0105519 A1 | 4/2010 | Kasuya et al. | |
| 2011/0118079 A1 * | 5/2011 | Mueller et al. | 477/5 |
| 2011/0239818 A1 | 10/2011 | Kasuya et al. | |
| 2011/0240430 A1 * | 10/2011 | Iwase et al. | 192/3.29 |
| 2011/0240431 A1 | 10/2011 | Iwase et al. | |
| 2013/0192945 A1 * | 8/2013 | Frait et al. | 192/3.21 |

* cited by examiner

*Primary Examiner* — Gene Crawford
*Assistant Examiner* — Ryan Dodd
(74) *Attorney, Agent, or Firm* — David B. Kelley; MacMillan, Sobanski & Todd, LLC

(57) ABSTRACT

A powertrain module includes an input, a bulkhead supporting the input, a rotor support, a torque converter casing driveably connected to the rotor support, an electric machine including a stator supported on the bulkhead and a rotor connected to the rotor support, a clutch hub driveably connected to the input, and a clutch for alternately opening and closing a drive connection between the clutch hub and the rotor support.

10 Claims, 2 Drawing Sheets

MODULAR POWERTRAIN COMPONENT FOR HYBRID ELECTRIC VEHICLES

BACKGROUND OF THE INVENTION

1. Field of the Invention

This invention relates to a powertrain of hybrid electric vehicles, particularly to a powertrain module that can be installed between and secured to an engine output and a transmission input.

2. Description of the Prior Art

Hybrid electric vehicles (HEVs) have both an internal combustion engine and an electric machine, which are alternately, or in combination, used to propel the vehicle. A variety of different powertrains are used in hybrid vehicles such as a parallel configuration, in which the engine is connected to the motor by a disconnect clutch with the motor driving a torque converter input of an automatic power transmission. The transmission has an output which is connected to a differential coupled to the two driven wheels of the vehicle.

A need exists in the industry for a hybrid electric powertrain that includes a modular subassembly for use with a variety of engines and transmissions, such that the module can be installed between and secured to an output of one of a number of engines and to an input of one of a number of transmissions. The assembled powertrain may then be employed in a variety of vehicles. The module should include a hydraulically actuated disconnect clutch, the electric machine and suitable power paths between the engine and electric machine to the transmission input. Preferably, the module provides for hydraulic communication from the transmission's hydraulic system to the clutch, a balance dam and the electric machine. The module must provide an oil sump containing hydraulic fluid delivered to the module, and a path for continually returning that fluid to the transmission's oil sump so that the transmission pump is continually supplied reliably with fluid.

The module should require low manufacturing and assembly costs and no vehicle body modification, and should provide reliable performance.

SUMMARY OF THE INVENTION

A powertrain module includes an input, a bulkhead supporting the input, a rotor support, a torque converter casing driveably connected to the rotor support, an electric machine including a stator supported on the bulkhead and a rotor connected to the rotor support, a clutch hub driveably connected to the input, and a clutch for alternately opening and closing a drive connection between the clutch hub and the rotor support.

A torque converter casing can be driven by the engine alone, provided the electric machine is off and the clutch is engaged; by the electric machine alone, provided the engine is off or the engine in operating and the clutch is disengaged; and by both the engine and electric machine concurrently.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1A:
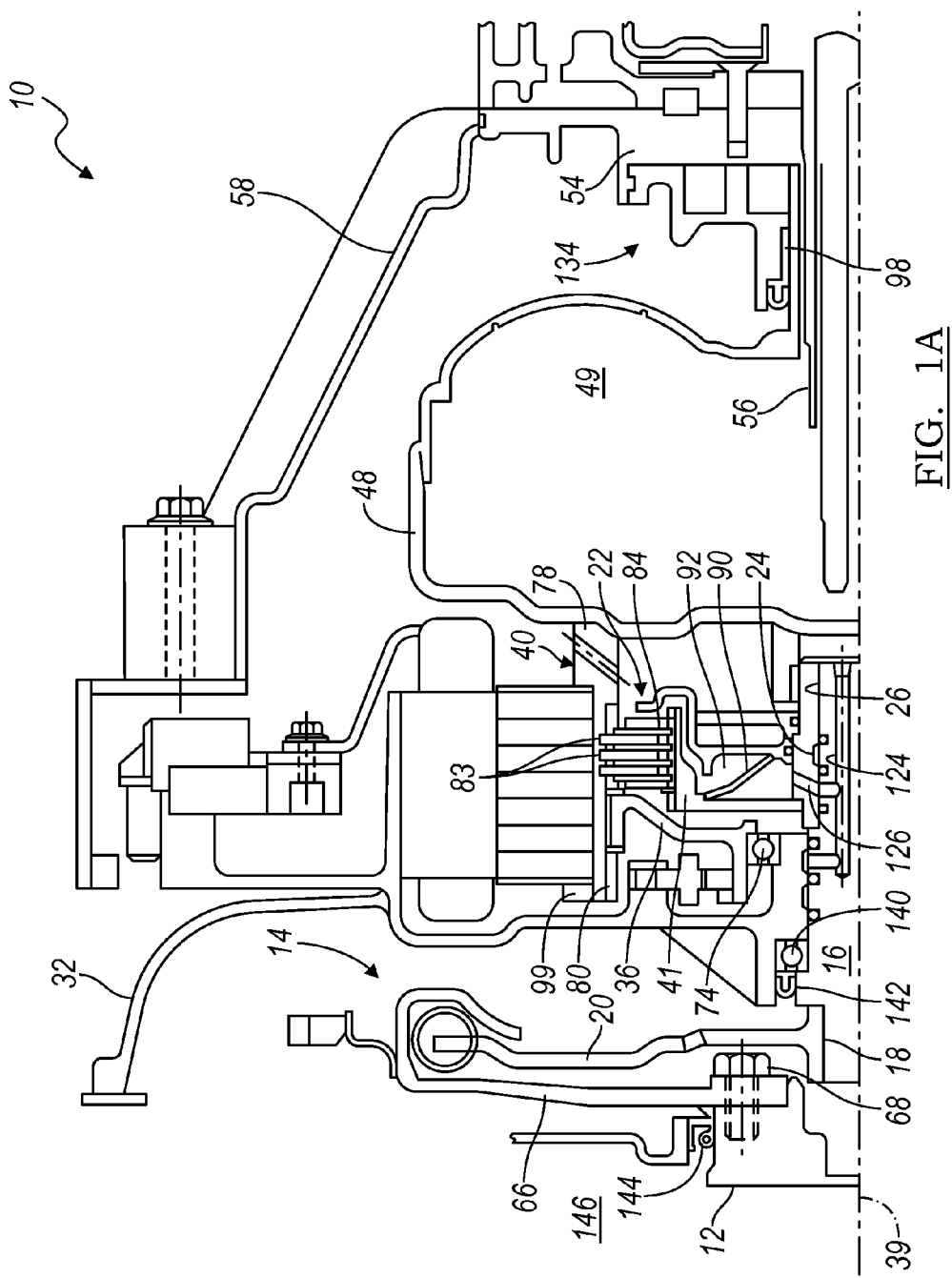
FIGS. 1A and 1B comprise a side cross-sectional view of a powertrain module showing a front connection to an engine output and a rear connection to a transmission torque converter input.
Figure 1B:
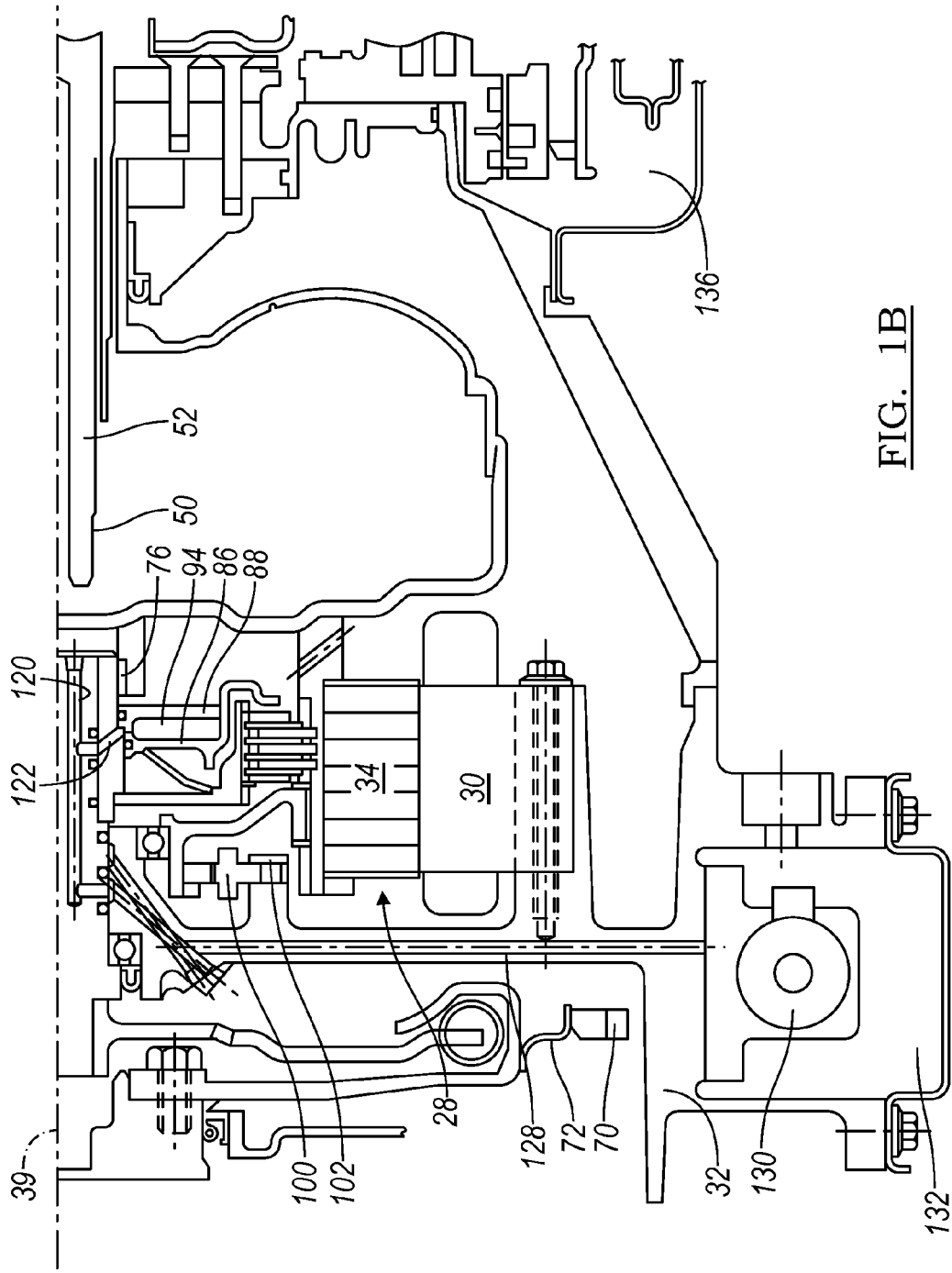

FIG. 1 illustrates a module 10 of a powertrain for a hybrid electric vehicle that includes an engine having a rotary output 12; a torsional damper 14, secured to the engine output 12; an input shaft 16, secured by a spline 18 to an output 20 of damper 14; a disconnect clutch 22, supported on a clutch hub 24 that is secured by a spline 26 to input shaft 16; an electric machine 28, which includes a stator 30 bolted to a front bulkhead 32 and a rotor 34 supported by a first leg 36 and a torque converter casing 48 for rotation about an axis 39; and a rotor support 40, secured directly to casing 48. The torque converter casing 48 encloses a hydrokinetic torque converter 49. The electric machine 28 may be an electric motor or an electric motor-generator.

Torque converters suitable for use in the powertrain are disclosed in and described with reference to FIGS. 4a, 4b, 5, 12 and 15 of U.S. patent application Ser. No. 13/325,101, filed Dec. 14, 2011, the entire disclosure of which is herein incorporated by reference.

The torque converter 49 includes a bladed impeller wheel located within and secured to casing 48; a bladed turbine, driven hydrokinetically by the impeller and secured by a spline 50 to the input shaft 52 of an automatic transmission 54; and a bladed stator wheel, located between the turbine and stator and secured to a stator shaft 56, which is held against rotation on a transmission housing 58.

A flywheel 66, secured by bolts 68 to the engine's rotary output 12, carries an engine starting gear 70, which is secured by a disc 72, welded to the starting gear 70 and flywheel 66.

A bearing 74 supports the first leg 36 for rotation on the front bulkhead 32. A bearing 76 supports the torque converter casing 48 for rotation on the input shaft 16.

The rotor support 40 is formed by a tube 78, aligned with axis 39, supports the rotor 34 for rotation about the axis and is secured to the first leg 36 and casing 48. Lips 99 at the front end of tube 78 may be rolled radially outward to secure the rotor 34 to tube 78 and to prevent axial displacement of the rotor 34 relative to the tube. The inner surface of tube 78 is formed with an axial spline 80, which is engaged by alternate plates 83 of the disconnect clutch 22. The friction plates 84 of clutch 22 are secured by an axial spline formed on the radial outer surface of clutch hub 24.

A hydraulic servo for actuating clutch 22 includes a piston 86, balance dam 88, return spring 90 and hydraulic lines for transmitting actuating pressure to the pressure balance volume 92 at the right hand side of piston 86 and to the pressure control volume 94 at the left hand side of the piston. Piston 86 moves leftward in a cylinder bounded by the reaction wall 88 (sometimes called a balance dam) and disconnect hub 41 when actuating pressure and hydraulic fluid is supplied to volume 92, thereby causing clutch 22 to engage and driveably connect rotor 34 and the engine output 12 through damper 14, input shaft 16, clutch hub 24 and clutch 22.

Because the clutch hub 24 is secured by spline 26 to input shaft 16 and to a disconnect hub 41, piston 86, balance dam 88 and return spring 90 are supported on the clutch hub 24, rotational inertia of the piston 86, balance dam 88, clutch hub 24 and return spring 90 is located on the input side, i.e., the engine side of clutch 22.

Rotor 34 is continually driveably connected to the transmission input shaft 52 through the torque path that includes tube 78 and torque converter casing 48, and the hydrodynamic drive connection between the torque converter impeller and turbine, which is connected to transmission input shaft 52.

A resolver 100, a highly accurate type of rotary electrical transformer used for measuring degrees of rotation, is secured by bolts 102 to the front bulkhead 32, is supported on the front bulkhead 32, and is located axially between the first bulkhead and torque converter casing 48.

Input shaft 16 is formed an axially-directed hydraulic passages, which communicates with a laterally-directed passage, which carry hydraulic fluid and pressure to module 10 from the hydraulic system of the transmission 54. Axial passage 120 and lateral passage 122 carry hydraulic fluid and pressure to the pressure control volume 94 between reaction wall 88 and piston 86. Axial passage 124 and radial passage 126 carry hydraulic fluid to the balance volume 92. The front bulkhead 32 is formed with passage 128, which communicates hydraulically with a variable force solenoid (VFS) 130. Other passages carry hydraulic fluid to the surfaces of rotor 34 and stator 30, which surfaces are cooled by the fluid.

The front bulkhead 32 supports a sump 132, which contains fluid supplied to module 10 from the hydraulic system of the transmission 54. Transmission 54 includes a sump 136, which contains hydraulic fluid that is supplied by a transmission pump 134 to the transmission hydraulic system, from which fluid and control pressure is supplied to module 10, torque converter 49, transmission clutches and brakes, bearings, shafts, gears, etc.

A bearing 140, fitted in the front bulkhead 32, and bearing 76 support input shaft 16 in rotation about axis 39. The front bulkhead 32 also supports the stator 30 in its proper axial and radial positions relative to the rotor 34.

Seal 142, fitted in the front bulkhead 32, prevents passage of fluid from module 10. Another dynamic seal 144 prevents passage of contaminants between the engine compartment 146 and module 10.

The components of module 10 are installed and assembled in the module. The assembled module can then be installed between and connected to the engine output 12 and the torque converter casing 48.

Bearing 98 in pump 54 supports torque converter casing 48 to position rotor 34 with respect to axis 39.

In operation, when the engine output 12 is driven by an engine, torque is transmitted from the engine through rotor support 40 to the torque converter casing 48, provided that clutch 22 is engaged. The rotor 34 of electric machine 28 is continually driveably connected through tube 78 of rotor support 40 to the torque converter casing 48. Therefore, the torque converter casing 48 can be driven by the engine alone, provided the electric machine 28 is off and clutch 22 is engaged; by the electric machine alone, provided the engine is off or the engine in operating and the clutch 22 is disengaged; and by both the engine and electric machine 28 concurrently.

In accordance with the provisions of the patent statutes, the preferred embodiment has been described. However, it should be noted that the alternate embodiments can be practiced otherwise than as specifically illustrated and described.

The invention claimed is:

1. A powertrain module, comprising:
   an input;
   a bulkhead supporting the input;
   a rotor support including a tube and a leg;
   a torque converter casing driveably connected to the rotor support;
   an electric machine including a stator supported on the bulkhead and a rotor connected to the rotor support;
   a clutch hub driveably connected to the input;
   a clutch for alternately opening and closing a drive connection between the clutch hub and the rotor support;
   the tube secured to the rotor and the clutch;
   the leg secured to the tube and supported for rotation on the bulkhead by a second bearing;
   first clutch plates secured to the clutch hub;
   second clutch plates secured to the tube;
   a cylinder formed by the clutch hub;
   a balance dam supported on the input;
   a piston supported on the input, moveable in the cylinder, for forcing the first and second clutch plates into mutual frictional engagement, thereby engaging the clutch;
   a return spring supported on the input, for forcing the piston away from the clutch plates, allowing the clutch plates to mutually disengage, thereby disengaging the clutch; and
   wherein the bulkhead includes fluid passages extending from the input to a sump in the bulkhead for containing hydraulic fluid, a solenoid-actuated valve, and a line communicating hydraulically with the solenoid-actuated valve.

2. The module of claim 1, further comprising a servo supported on the clutch hub, the servo actuating the clutch.

3. The module of claim 1, further comprising a torsion damper connected to the input and connectable to an engine output, said damper located in a torque delivery path between the engine output and the input.

4. The module of claim 1, further comprising a first bearing fitted in the bulkhead for supporting the input in rotation.

5. The module of claim 1, further comprising a resolver secured to the bulkhead and the leg.

6. A powertrain module, comprising:
   an input;
   a bulkhead supporting the input;
   a rotor support including a tube and a leg;
   a torque converter casing driveably connected to the rotor support;
   an electric machine including a stator supported on the bulkhead and a rotor connected to the rotor support;
   a clutch for alternately opening and closing a drive connection between the input and the rotor support;
   a servo supported on the input for actuating the clutch;
   the tube secured to the rotor and the clutch;
   the leg secured to the tube and supported for rotation on the bulkhead by a second bearing;
   a clutch hub driveably connected to the input;
   the clutch further includes:
      first plates secured to the clutch hub;
      second plates secured to the tube;
      a cylinder formed by the clutch hub;
   the servo further includes:
      a balance dam supported on the input, located adjacent the balance dam;
      a piston supported on the input, moveable in the cylinder, for forcing the first and second plates into mutual frictional engagement, thereby engaging the clutch;
      a return spring supported on the input, for forcing the piston away from the clutch plates, allowing the clutch plates to mutually disengage, thereby disengaging the clutch; and
   wherein the bulkhead includes fluid passages extending from the input to a sump in the bulkhead for containing hydraulic fluid, a solenoid-actuated valve, and a line communicating hydraulically with the solenoid-actuated valve.

7. The module of claim 6, further comprising:
the clutch hub supporting the servo; and
hydraulic lines formed in the input and clutch hub and communicating hydraulically with the servo.

8. The module of claim 6, further comprising a damper connected to the input and connectable to an engine output, said damper located in a torque delivery path between the engine output and the input.

9. The module of claim 6, further comprising a first bearing fitted in the bulkhead for supporting the input in rotation.

10. The module of claim 6, further comprising a resolver secured to the bulkhead and the leg.

* * * * *